Aug. 8, 1961  W. H. EBURN, JR., ET AL  2,995,072
ATTACHING DEVICE

Filed May 13, 1958  4 Sheets-Sheet 1

INVENTORS
William H. Eburn, Jr.
and
BY Richard R. Wareham

Brown and Mikulka
Attorneys

United States Patent Office 2,995,072
Patented Aug. 8, 1961

2,995,072
ATTACHING DEVICE
William H. Eburn, Jr., East Weymouth, and Richard R. Wareham, Marblehead, Mass., assignors to Polaroid Corporation, Cambridge, Mass., a corporation of Delaware
Filed May 13, 1958, Ser. No. 734,925
11 Claims. (Cl. 95—10)

This invention relates to photographic apparatus, and particularly to a means for adapting a camera for automatic exposure control.

The simplest, well-known commercial camera may be represented by the so-called "box" camera which is usually characterized by having a small fixed aperture and one or two different shutter speeds. Although this camera has the advantage of simplicity in operation and construction, it finds a limited application in photography, being responsive to only a narrow range of scene luminosity and being deficient in ability to "stop" motion. On the other hand, there is a host of fine cameras capable of use under a wide range of conditions involving extremes in scene luminosity and ability to "stop" moving subjects. These fine cameras generally include focus adjustment controls with a range from infinity to a few feet, and an exposure control comprising a range of diaphragm apertures from the full diameter of the camera's objective lens to small openings in the nature of f/100, and shutter speeds ranging from as low as one-half to as fast as one two-thousandths of a second. Although these fine cameras may be employed over a sometime extraordinary scope of various exposures, they are often so complex that the camera operator may easily err in adjusting the shutter, aperture and focus controls.

With the advent of the photoelectric cell, a group of exposure control mechanisms have been constructed wherein scene luminosity has been employed as a parameter for controlling exposure value. These automatic exposure control mechanisms may be employed as attachments on cameras, as for instance those known in the art as Polaroid Land cameras, for adapting the cameras to automatic exposure control. Most of the Polaroid Land cameras comprise a shutter mechanism having an exposure control means characterized by a single manual control for selecting one of a plurality of correlated shutter speed and diaphragm aperture combinations.

It is therefore an object of this invention to provide means for releasably coupling a camera having a shutter mechanism as described with an auxiliary exposure control means. Another object is to provide means for releasably coupling such a camera with an auxiliary automatic exposure control means responsive to light intensity of the camera field of view, whereby the camera operator need make no manual adjustments for exposure control. Other objects are to provide an apparatus which will endow the complex camera with the simplicity of operation of the "box" camera, thereby gaining the advantages of both, which apparatus comprises an automatic exposure control means responsive to intensity of light, and means for releasably coupling said complex camera with said automatic exposure control means; to provide a coupling means for adapting a camera for use with an auxiliary exposure control means, said camera comprising a shutter mechanism, an actuating arm for opening said shutter mechanism and a bulb latch control lever for effecting the retention of said shutter mechanism in an open position, said coupling means comprising elements so cooperating with said actuating arm and bulb latch control lever that the shutter mechanism is retained in said open position while said coupling means is operatively adapting said camera for use with said exposure control means.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
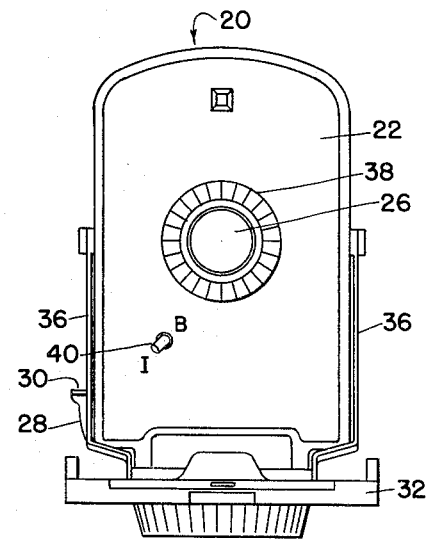
FIGURE 1 is a front elevation of a fragment of a camera upon which the invention is adapted for mounting and showing exterior details only.

Generally, the present invention comprehends an attachment which is connected to a camera for adapting the camera for auxiliary exposure control. Such attachment, in its general form, comprises an auxiliary exposure control device and an attaching means. Although it may be desirable to employ an auxiliary exposure control device which simply enlarges the range of available exposure values, the attachment preferably comprises a photoresponsive exposure control device wherein exposure value is automatically adjusted in a predetermined manner responsively to the output of a photoelectric cell. More particularly, a device such as is disclosed in the copending U.S. application of Lothrop, Purcell and Whittier, Serial No. 711,331, filed January 27, 1958, lends itself well to use as an element of the attachment, being both simple and rugged, and having the advantages of compactness and light weight. The camera preferably is of the type shown and described in U.S. Patent No. 2,455,111 issued November 30, 1948, to J. F. Carbone et al. and sold by Polaroid Corporation, and which comprises a main shutter mechanism enclosed in a housing from which extends an actuating means for setting and tripping the shutter mechanism and a bulb latch actuator for adjusting the shutter mechanism for bulb exposure. As an attaching means there is generally provided a mechanism which essentially releasably couples the camera with the auxiliary exposure control device and which may be operated to so adjust the shutter mechanism of the camera as to relieve the operator of any further adjustments. The attaching means therefore preferably includes means for moving the camera actuating means, a means for moving the camera bulb latch actuator, and a master means for moving the aforementioned means in a predetermined manner. To negate the possibility of premature exposure by inadvertent actuation of the auxiliary exposure control while the operator is moving the master means to effect coupling, there is also provided a means for rendering the auxiliary exposure control inoperative until the operator has completed the coupling of camera and attachment. Referring now to the drawings, a shutter housing, schematically illustrated at 22, is connected to the camera body (not shown) by means such as the usual extensible bellows 24. Housing 22 comprises means for defining an exposure aperture 26 and encloses a main shutter mechanism (not shown) a portion of which is movable in and out of covering relation to said exposure aperture. The lens and shutter assembly of the camera used herein for illustration preferably comprises a shutter mechanism as disclosed in U.S. Patent No. 2,504,312, issued April 18, 1950, to Murry N. Fairbank, or the shutter mechanism disclosed in the copending U.S. application of Sidney B. Whittier, Serial No. 388,641, filed October 27, 1953, now U.S. Patent No. 2,877,697. A portion of a means for setting and tripping the main shutter mechanism of the camera is shown, as for instance, comprising actuating arm 28 extending from housing 22. Actuating arm 28 is provided with a pressure surface 30 upon which force may be applied by a camera operator to actuate the lens and shutter assembly.

As a means for supporting and protecting housing 22, there is provided the usual camera bed 32 to which housing 22 is pivotally attached by suitable pivot means as at 34. As a means for supporting housing 22 in an erect position, there are provided longitudinal elements such as braces 36 which are pivotally attached at their respective extremities to housing 22 and to a portion of bed 32. Projecting forwardly from housing 22 is a portion of a lens-holding means such as collar 38. Collar 38 comprises the usual cylindrical tubular extension having an internal diameter substantially equal to the diameter of the lens of the camera and disposed coaxially with respect to said lens. Adjacent collar 38 and also projecting forwardly from housing 22 is a latch actuator for adjusting the assembly for "bulb" exposure, the latch actuator in this embodiment comprising a lever 40 adapted for movement between a position "I" wherein the shutter and lens assembly is adjusted for "instantaneous" exposures and a position "B" wherein the assembly is adjusted for "bulb" exposure. The shutter and lens assembly is preferably characterized in that when lever 40 is in position "B," pressure applied to actuating arm 28 will actuate the assembly so as to present an unobstructed optical path therethrough until the pressure on actuating arm 28 is removed and the actuating arm returns to its normal or rest position.

Figure 3:
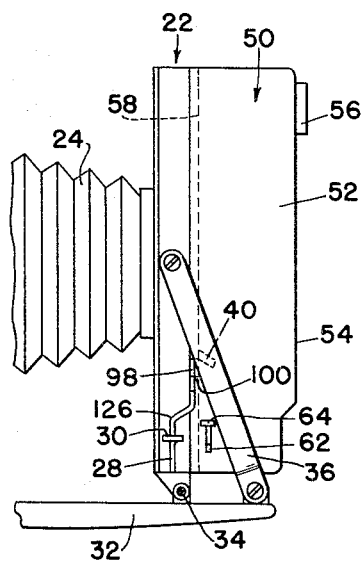
FIG. 3 is a side elevation of the camera fragment of FIGURE 1 with an auxiliary exposure control mounted thereon.

The auxiliary exposure control means, as shown generally at 50 in FIG. 3, may comprise any of the so-called photosensitive exposure control mechanisms known in the art, such as the photoresponsive diaphragm control shown in U.S. Patent No. 2,163,737, issued June 27, 1939, to F. B. A. Prinsen, but preferably comprises one of a variety of photoelectrically controlled shutters well known in the art. It should be noted that the auxiliary exposure control means may also comprise one of a variety of manually controlled shutters or shutter diaphragm combinations, particularly where the camera operator merely wishes, for instance, a different shutter speed range or diaphragm aperture range than is provided by the camera proper. In the preferred form, the auxiliary exposure control means 50 comprises a mechanism as shown and described, for example, in the aforesaid copending application of Lothrop, Purcell and Whittier and which includes housing 52 wherein the elements thereof are contained, housing 52 having a front surface 54 through which photosensitive means such as photocell 56 may extend in the event that the control means are to be made photoresponsive. Housing 52 also comprises a rear surface 58 in which is disposed an exposure aperture 60. Aperture 60, of course, extends through control means 50 from the rear surface 58 to the front surface 54. Shown in FIGS. 4 and 5 as extending laterally of housing 52 through an opening 62 therein is a means, such as actuating member 64, for actuating the elements of control means 50, actuating member 64 being shown in a rest position wherein said member, for instance, abuts marginal portion 66 of housing 52. Member 64, in the form shown, is pivotally attached by suitable means such as pivot 68 which extends through rear surface 58, member 64 being adapted for manual engagement by an operator for rotating said member from the rest position to a displaced position wherein member 64, for example, abuts marginal portion 70 of housing 52, the rotation of member 64 from rest to displaced position actuating exposure control means 50. As a means for so coupling member 64 to the means for releasably coupling the exposure control means 50 with camera 20, member 64 is provided with an upstanding portion such as tab 72 which preferably extends through rear surface 58 of housing 52.

Figure 6:
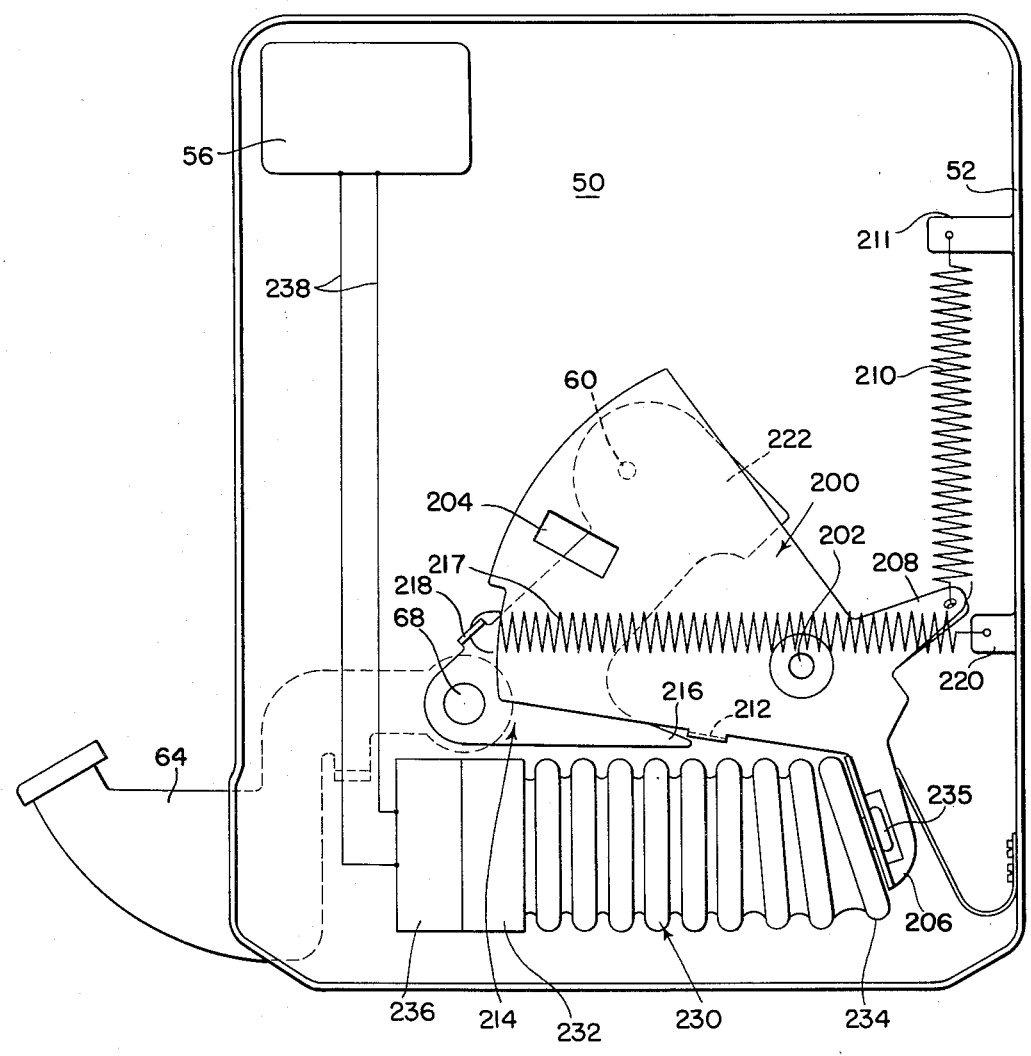
FIG. 6 is a schematic plan view of an auxiliary exposure control device.

In FIG. 6, there is shown a preferred embodiment of the elements of the auxiliary exposure control means 50 wherein there is provided a means for covering and uncovering aperture 60, said means comprising a single bladed element 200 which is mounted normally in covering relation to aperture 60 and for pivotal movement about pivot 202 between a covering or rest position and a displaced position. Blade 200 includes an opening 204 therein, which opening is adapted to pass across aperture 60 during exposure movement of said blade, i.e., a portion of the pivotal movement of blade 200 from the rest position wherein opening 204 lies to one side of aperture 60 to the displaced position wherein said opening lies to an opposite side of said aperture. Blade 200 is provided with an arm portion 206 disposed approximately on the opposite side of the pivotal axis of the blade from opening 204. Also disposed approximately on the opposite side of the pivotal axis of the blade from opening 204 is lever portion 208 of blade 200, lever portion 208 and arm portion 206 being angularly disposed relative to one another. As a means for urging blade 200 for movement from the displaced to the rest position, there is provided resilient means such as spring 210, the extremities of which are anchored respectively to lever portion 208 and to tab 211 on housing 52. As a means for cooperating with a portion of actuating member 64 for urging blade 200 from rest to displaced position, blade 200 is provided with an engageable means such as upstanding portion 212.

Actuating member 64 is connected by means such as pivot 68 to means such as member 214 for moving blade 200 from rest to displaced position. Member 214 comprises finger 216 which is so disposed relative to upstanding portion 212 on blade 200 as to be releasably engageable with the upstanding portion during a portion of rotary movement of member 214 about pivot 68 from rest to displaced position. A resilient means such as spring 217 is provided for urging actuating member 64 toward the rest position, spring 217 being attached to member 214 as at 218 and also being anchored to portion 220 of housing 52.

As no exposure is intended to be made during movement of blade 200 from the rest position to the displaced position, in the preferred form of the invention an auxiliary means, such as shutter blind portion 222 of member 214, is provided for covering aperture 60 during that portion of the movement of the blade from rest position to displaced position during which opening 204 in blade 200 passes across aperture 60. Shutter blind portion 222 is shown so integrally attached to member 214 that movement of the actuating member for rotating blade 200 into the displaced position moves the shutter blind member into covering relation to aperture 60 during that portion of the movement when opening 204 overlies aperture 60.

As a means for variably controlling the speed of pivotal movement of the blade from displaced position to rest position and therefore variably controlling the exposure, there is provided a pneumatic element such as bellows 230 having a stationary extremity 232 and a movable extremity 234, the latter being axially movable to allow expansion and collapse of the bellows. Movable extremity 234 is connected by direct attachment as at 235 to arm portion 206 of blade 200 and is so disposed in the arcuate path of movement of arm 206 that clockwise rotation of blade 200, i.e., from rest to displaced position, collapses the bellows. Bellows 230 is preferably provided in a cylindrical form having an elastic structural material. As a means for controlling the rate of expansion or collapse of bellows 230 there is provided a valve means 236 for variably controlling the transmission of a fluid in and out of bellows 230 and being so coupled with photocell 56 by means such as leads 238 as to be responsive to electrical signals from said photocell. The valve means 236 may comprise, for example, the valve element shown in U.S. Patent No. 2,800,844, issued July 30, 1957, to J. Durst et al.

Figure 4:
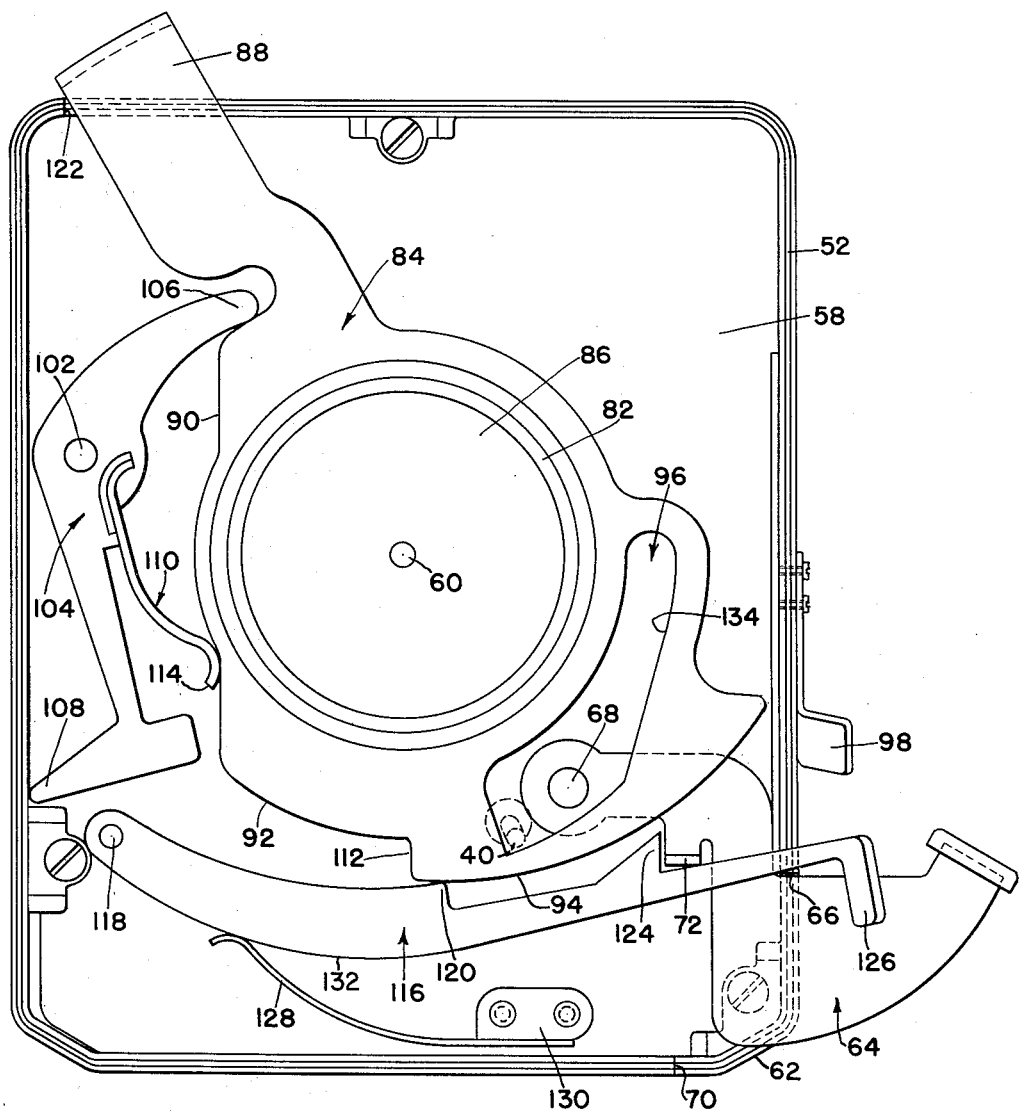
FIG. 4 is a schematic plan view of the elements of the coupling means in an operative position.
Figure 5:
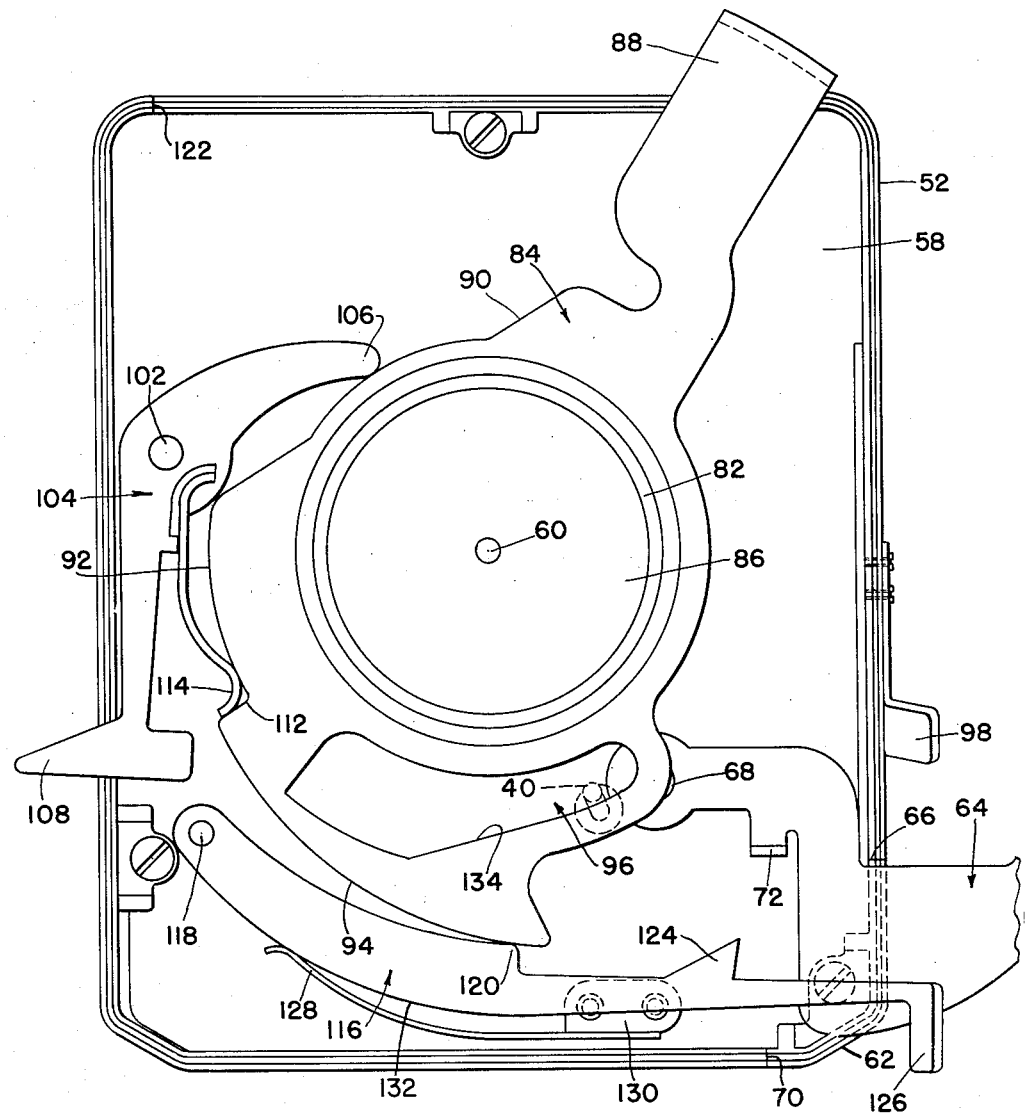
FIG. 5 is a schematic plan view of the elements of FIG. 4 in an operative position.

The elements of one form of attaching means for releasably coupling exposure control means 50 with camera 20 are shown in FIGS. 4 and 5. It should be noted that for convenience most of the elements of the attaching means are preferably mounted on the rear surface 58 of control means housing 52. As a means for aligning the optic axis of camera 20 approximately colinearly with the optic axis of exposure control means 50 and for providing a lighttight juncture, there is provided, for example, a cylindrical element such as well 82 which comprises a portion of rear surface 58 and is preferably disposed concentrically about exposure aperture 60 and extending normally from said rear surface. Well 82 is so dimensioned internally as to be adapted to fit snugly about the external periphery of collar 38 of the camera and may, in other embodiments, be resiliently deformable for adaptation to various sizes of other lens collars.

As a master means for moving most of the various other elements of the attaching means there is provided, for example, a cam element 84 which is preferably mounted on rear surface 58 and comprises a substantially planar element having an irregular ring shape defining an approximately central opening 86. Opening 86 is so dimensioned for sliding engagement about the external periphery of well 82 that element 84 may be pivotally movable about an axis approximately coincident with the optic axes through the exposure apertures of camera 20 and control means 50. Extending radially from element 84 and in the plane thereof is arm portion 88 which is shaped to extend beyond an edge of rear surface 58 and is adapted for manual engagement by an operator as a means for rotating element 84 in a plane perpendicular to the optic axis through aperture 60. Element 84 is provided about its irregular ring-shaped periphery with a first cam profile 90, a peripheral portion 92 and a second cam profile 94. Disposed, for example, between the periphery of element 84 and central opening 86 is a third cam profile in the form of cam slot 96.

Figure 2:
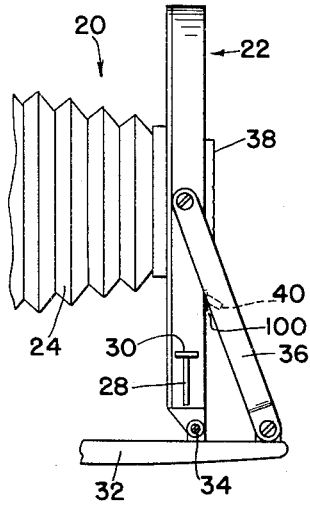
FIG. 2 is a side elevation of the camera fragment of FIGURE 1.

The attaching means also comprises a member such as resilient tab 98 which is attached to housing 52 and so extends laterally from housing 52 in a plane approximately parallel with the plane of rear surface 58 as to be adapted for engagement in wedge-shaped slot 100 formed by the juncture of one of braces 36 and housing 22 of camera 20 (see FIGS. 2 and 3). Pivotally mounted by suitable means such as pivot 102 on rear surface 58 adjacent cam element 84 is a locking means such as locking element 104. Locking element 104 comprises an arcuate member which is rotatable about pivot 102 and which comprises portions such as first cam follower 106 and engaging foot 108 which are disposed respectively on opposite sides of pivot 102. Engaging foot 108 is so adapted as to be engageable in a similar wedge-shaped slot formed by the juncture of the other of braces 36 and housing 22 of camera 20. First cam follower 106 is disposed in such sliding engagment with first cam profile 90 of cam element 84 that rotation of cam element 84 in a clockwise direction rotates locking element 104 in a clockwise direction. As a means for so biasing locking element 104 that first cam follower 106 remains in sliding engagement with first cam profile 90 and as a means for limiting the clockwise rotation of cam element 84, there is provided a resilient means, for example, first leaf spring 110, one extremity of which is attached to element 104 adjacent pivot 102 and the other extremity of which is in sliding engagement with peripheral portion 92 of element 84. Peripheral portion 92 comprises an abutting portion such as stop profile 112 which is disposed perpendicularly to the arc of rotation of cam element 84 and which is so adapted for engagement with extremity 114 of first leaf spring 110 as to limit the rotation of cam element 84 in a clockwise direction.

The attaching means also comprises a longitudinal member 116 which is mounted for pivotal movement by means such as pivot 118 upon rear surface 58, pivot 118 being disposed at one extremity of longitudinal member 116. Longitudinal member 116 comprises a means such as second cam follower 120 in sliding engagement with and responsive to the configuration of second cam profile 94 for rotating member 116 about pivot 118. As a means for so coupling the attaching means with exposure control means 50 that the exposure control means may not be actuated until cam element 84 has been rotated from the rest position wherein arm 88 abuts marginal portion 122 of rear surface 58 to an operative or actuated position wherein first spring 110 abuts stop profile 112, longitudinal member 116 is provided with a stop portion such as extension 124. Extension 124, when cam element 84 is in an inoperative or rest position, is so disposed as to abut tab 72 of actuating member 64, thereby preventing actuating member 64 from being rotatable from its rest to its displaced position. Longitudinal member 116 is also provided with a means such as finger 126 for engaging actuating arm 28 of camera 20. Finger 126 is preferably disposed at that extremity of longitudinal member 116 furthest from pivot 118 and is adapted to abut pressure surface 30 of actuating arm 28 when collar 38 of camera 20 is disposed within well 82 and tab 98 and engaging foot 108 are in engagement with the respective wedge-shaped slots. As a means for so urging longitudinal member 116 in a counterclockwise direction so that second cam follower 120 remains in sliding engagement with second cam profile 94, there is provided a resilient means such as second leaf spring 128. One extremity of second leaf spring 128 is preferably anchored to rear surface 58 as at 130, the other extremity of second leaf spring 128 being in slidable engagement with arcuate surface 132 of longitudinal member 116.

Cam slot 96 is so disposed in cam element 84 that, when the cam element is in the rest position, when well 82 is suitably positioned with respect to collar 38 of camera 20, and when the shutter control lever is in position "I," cam surface 134 of slot 96 is in sliding engagement with control lever 40.

The operation of the mechanism heretofore disclosed is substantially as follows: with arm portion 88 in the inoperative position abutting portion 122 of the rear surface 58, the operator of the mechanism may manually place the auxiliary exposure control means 50 and the connected attaching means upon the camera such that resilient tab 98 engages wedge-shaped slot 100 between one of braces 36 and housing 22 and with well 82 fitting snugly over collar 38 of camera 20. This serves to align the optic axes of the exposure control means 50 and the camera 20 and places finger 126 adjacent to or abutting pressure surface 30 of actuating arm 28, all as shown in FIG. 3. Manual rotation by the operator of arm portion 88 from the inoperative position to the operative position rotates cam element 84 in a clockwise direction to the position shown in FIG. 5. As may be seen in FIG. 5, rotation of cam element 84 in a clockwise direction so rotates first cam profile 90 as to move first cam follower 106 responsively, thus rotating locking element 104 about pivot 102 and so moving engaging foot 108 as to extend the engaging foot beyond the edge of rear surface 58 and into engagement with the wedge-shaped portion formed by the other of braces 36 and assembly 22.

At substantially the same time, the rotation of cam element 84 rotates second cam profile 94 in a clockwise direction, moving second cam follower 120 responsively thereto and rotating longitudinal member 116 in a counterclockwise direction about pivot 118. The counterclockwise rotation of longitudinal member 116 so rotates extension 124 that the said extension no longer abuts tab 72 of actuating member 64, thus freeing member 64 for subsequent rotation by the operator. Additionally, the counterclockwise rotation of longitudinal member 116 so rotates finger 126 as to depress actuating arm 28 of camera 20 and actuate the shutter assembly enclosed in housing 22. The clockwise rotation of cam element 83 continues until the engagement of extremity 114 of first spring 110 with stop profile 112 prevents further motion.

It should be noted that the initial placement of the attaching means is such that control lever 40 is positioned inside cam slot 96 as shown in FIGS. 1 and 4, and with rotation of cam element 84 in a clockwise direction, the sliding engagement of cam surface 134 of slot 96 with shutter control lever 40 moves the shutter control lever from position "I" to position "B" wherein the shutter control lever is retained, as shown in FIG. 5, until released by later counterclockwise rotation of cam element 84. In the preferred embodiment of the camera, the shutter and lens assembly is preferably set for "bulb" exposure when the control lever is in position "B" and the actuation of the shutter and lens assembly by the rotational movement of finger 126 opens the shutter and lens assembly to the "bulb" position in which the assembly will remain until actuating arm 28 of camera 20 is released. The auxiliary exposure control means 50 is now locked securely to camera 20 and is ready for actuation by manual manipulation of actuating member 64 to effect an exposure. The rotation of arm portion 88 by the operator from the operative position to the inoperative position reverses the direction of rotation of cam element 84 and the direction of rotation of the various cam profiles and peripheral portion to effect the reverse of the movement of the elements as heretofore described. The release of pressure upon actuating arm 28 with the approximately simultaneous return of control lever 40 from position "B" to position "I" closes the shutter mechanism in housing 22. The rotation of locking element 104 withdraws engaging foot 108 from engagement with the wedge-shaped slot 100 and so releases the auxiliary exposure control means 50 that it may be manually separated from the camera.

It should be noted that the attachment as heretofore shown and described comprises an exposure control means wherein the elements are approximately disposed radially about an exposure aperture and hence lie roughly in a plane. Additionally, the attachment comprises an attaching means, the elements of which are also disposed approximately radially about the central aperture 60 and are disposed substantially in a plane. This configuration of the various elements of the attachment provide a compact form which is not so bulky as to interfere with the operation of the camera, is comparatively small with respect to the overall camera dimensions, is easily portable and which does not produce undesirable vignetting. In operation, the attachment is easily affixed to the camera in a single movement and equally readily detachable with a single reverse movement. Because most of the elements of the attachment may be manufactured of stamped sheet parts which are comparatively few in number, the weight of the attachment permits its use with a camera mounted upon a tripod without modification of the tripod to compensate for an unbalanced camera as would occur with a heavy attachment.

Mechanisms schematically shown in the drawings indicate a plurality of elements which are in the preferred form for performing various functions as hereinbefore described. However, it will be evident that certain of these elements may be readily altered in form or interchanged with further modification and that numerous other elements could be employed within the scope of the invention to perform similar functions. For instance, the relative positions of the various cam surfaces could be readily altered to adapt the attaching means for use with other types of cameras. Additionally, in place of tab 98 there might readily be provided another element similar to locking element 104 such that the rotation of cam element 84 would extend two engaging feet on opposite sides of the control means for locking the auxiliary exposure control means to the camera.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An auxiliary attachment for controlling exposures of a photographic apparatus, which apparatus includes a lens and a shutter mechanism having a timing device for controlling instantaneous exposures and means for disconnecting said device to allow said shutter mechanism to effectuate bulb exposures, said attachment comprising, in combination, housing means, coupling means mounted on said housing means and being movable with respect to said housing means for releasably locking the latter to said apparatus in covering relation to said lens, means cooperating with said coupling means for actuating said means for disconnecting said timing device and moving said shutter mechanism to bulb exposure position while said housing means is being locked to said apparatus, and exposure control means for effecting exposures through said lens while said shutter mechanism is in said bulb exposure position.

2. An auxiliary attachment for controlling exposures of a camera, which camera includes a lens and a main shutter mechanism comprising a timing device for controlling instantaneous exposure and means for disconnecting said device to allow said shutter mechanism to effectuate bulb exposures, said attachment comprising, in combination, housing means providing an exposure aperture, coupling means mounted on said housing means and being movable with respect thereto for so releasably locking said attachment to said apparatus that said aperture overlies said lens, means cooperating with said coupling means for actuating said means for disconnecting said timing device and moving said shutter mechanism to bulb exposure position, and an auxiliary shutter mechanism operable independently of said camera for effecting exposures through said aperture while said main shutter mechanism is in said bulb exposure position.

3. An auxiliary attachment as defined in claim 2, wherein said attachment includes a photosensitive means for producing electrical signals in accordance with the intensity of light incident thereon, said auxiliary shutter mechanism being so electrically coupled with said photosensitive means that the exposure time interval of said auxiliary shutter mechanism is a function of said electrical signals.

4. An auxiliary attachment for controlling exposures of a photographic apparatus, which apparatus includes a lens, a main shutter mechanism cooperating with said lens and capable of selective adjustment for effecting both instantaneous and bulb exposures, an actuating member movable to a displaced position for moving a portion of said shutter mechanism to an open position for effecting an exposure, a bulb latch member movable to a predetermined position for effecting the retention of said portion of said shutter mechanism in said open position as long as said actuating member is retained in said displaced position, said attachment comprising, in combination housing means providing an exposure aperture, coupling means mounted on said housing means for movement with respect thereto for so releasably locking said attachment to said apparatus that said aperture overlies said lens, a first means cooperating with said coupling means for moving said bulb latch member to said predetermined position during said movement of said coupling means, a second means cooperating with said coupling means for moving said actuating member to said displaced position during said movement of said coupling means, and an auxiliary shutter mechanism operable independently of said main shutter mechanism for effecting exposures through said aperture when said portion of said main shutter mechanism is retained in said open position.

5. An auxiliary attachment as defined in claim 4, wherein said means for moving said bulb latch member to said predetermined position includes means for retaining said bulb latch member in said predetermined position, and wherein said means for moving said actuating member to said displaced position includes means for retaining said actuating member in said displaced position.

6. A coupling means for adapting a photographic apparatus for use with an auxiliary exposure control device, said apparatus including a shutter mechanism capable of selective adjustment for effecting both instantaneous and bulb exposures, an actuating member movable to a displaced position for moving a portion of said shutter mechanism to an open position for effecting an exposure, a bulb latch member movable to a predetermined position for effecting the retention of said portion in said open position as long as said actuating member is in said displaced position, said coupling means comprising a master means mounted on said exposure control device and being movable with respect thereto for so releasably locking and aligning said control device with said photographic apparatus that the optic axes of said device and apparatus are approximately colinear, means engageable with said bulb latch member for moving the latter to said predetermined position responsively to movement of said master means and means engageable with said actuating member for moving the latter to said displaced position responsively to said movement of said master means.

7. A coupling means as defined in claim 6, including means for retaining said bulb latch member in said predetermined position and means for retaining said actuating member in said displaced position.

8. A coupling means as defined in claim 6, wherein said means for moving said bulb latch member to said predetermined position includes means for retaining said bulb latch member in said predetermined position, and wherein said means for moving said actuating member to said displaced position includes means for retaining said actuating member in said displaced position.

9. A coupling means for adapating a photographic apparatus for use with an auxiliary exposure control device, said apparatus including a housing means having an exposure aperture therein, a shutter mechanism for covering and uncovering said aperture and capable of selective adjustment for effecting both instantaneous and bulb exposures, an actuating member movable to a displaced position for moving said shutter mechanism to an aperture-uncovering position for effecting an exposure, a bulb latch member movable to a predetermined position for effecting the retention of said shutter mechanism in said uncovering position as long as said actuating member is retained in said displaced position, and brace means for supporting said housing means in an erect position, said coupling means comprising means for aligning the optic axes of said apparatus and said device, master means mounted on said device and being movable with respect thereto, means attached to said device and being movable with respect thereto responsively to movement of said master means and into engagement with said brace means for locking said device to said apparatus, means responsive to movement of said master means for moving said bulb latch member to said predetermined position, means for retaining said bulb latch member in said predetermined position, means responsive to movement of said master means for moving said actuating member to said displaced position, and means for retaining said actuating member in said displaced position.

10. A coupling means as defined in claim 9 wherein said master means comprises a first cam profile in engagement with and for moving said means for locking said device to said apparatus, and a second cam profile in engagement with and for moving said means for moving said actuating member, and wherein said means for moving said bulb latch member comprises a third cam profile on said master means.

11. A coupling means for adapting a camera for use with an auxiliary exposure control device, said camera comprising a shutter housing means having an exposure aperture therein, a main shutter mechanism for covering and uncovering said exposure aperture, an actuating member movable to a displaced position for moving said main shutter mechanism to an aperture-uncovering position for effecting an exposure, a bulb latch member movable to a predetermined position for effecting the retention of said main shutter mechanism in said uncovering position and brace means for supporting said shutter housing means in an erect position, said auxiliary exposure control device including a second housing means having an opening therein, an auxiliary shutter mechanism for effecting exposures through said opening and a coupling means for releasably coupling said device with said camera, said coupling means comprising, in combination, a manually operable rotatable master member mounted on said second housing, a locking member pivotally mounted on said second housing and pivotable in and out of engagement with said brace means for releasably locking said device to said camera in a position wherein said opening overlies said aperture, a longitudinal member for moving said actuating member to said displaced position and being pivotably mounted on said second housing, said master member comprising a first cam profile in engagement with and for moving said locking member, a second cam profile in engagement with and for moving said longitudinal member and a third cam profile engageable with and for moving said bulb latch member.

References Cited in the file of this patent

UNITED STATES PATENTS

| | | |
|---|---|---|
| 819,110 | Wollensak | May 1, 1906 |
| 2,387,466 | Rath | Oct. 23, 1945 |
| 2,472,586 | Harvey | June 7, 1949 |
| 2,620,712 | Clifford | Dec. 9, 1952 |
| 2,683,506 | Immel | July 13, 1954 |
| 2,800,844 | Durst | July 30, 1957 |
| 2,844,234 | Brandes | July 22, 1958 |
| 2,849,936 | Fahlenberg | Sept. 2, 1958 |
| 2,885,938 | Durst | May 12, 1959 |